United States Patent [19]
Batha et al.

[11] 4,191,730
[45] Mar. 4, 1980

[54] METHOD OF REMOVING NITROGEN OXIDES FROM EXHAUST GAS MIXTURES

[75] Inventors: Howard D. Batha, Tonawanda; John H. Mason, Clarence; Stanley R. Thompson, Ransomville, all of N.Y.

[73] Assignee: The Carborundum Company, Niagara Falls, N.Y.

[21] Appl. No.: 934,738

[22] Filed: Aug. 21, 1978

Related U.S. Application Data

[63] Continuation of Ser. No. 835,470, Sep. 21, 1977, abandoned.

[51] Int. Cl.² .............................................. B01D 53/34
[52] U.S. Cl. ................................... 423/239; 423/212
[58] Field of Search ........................ 423/212, 239, 351

[56] References Cited

U.S. PATENT DOCUMENTS

| | | | |
|---|---|---|---|
| 3,459,494 | 8/1969 | Harris et al. | 423/239 |
| 3,816,595 | 6/1974 | LaHaye et al. | 423/239 |

OTHER PUBLICATIONS

Hightower, J. W. et al. in *The Catalytic Chemistry of Nitrogen Oxides*; Plenum Press, N.Y., 1975, pp. 63–87.
Yuan et al.; "J. Phys. Chem."; vol. 63; 1959.

*Primary Examiner*—G. O. Peters
*Attorney, Agent, or Firm*—David E. Dougherty; Raymond W. Green; Donald C. Studley

[57] ABSTRACT

A method of removing nitrogen oxides ($NO_x$) from exhaust gas mixtures is described. The removal of $NO_x$ from exhaust gas mixtures is accomplished by exposing the exhaust gas mixture, in a manner that does not substantially impede the gas flow, to a ceramic material containing from about 75% to about 95% by weight silicon carbide and from about 0.3% to about 10.0% silica. A reduction of at least 85% of $NO_x$ from the mixture is to be expected and reductions up to 95 to 100% are attainable. Ceramic mixtures containing silicon nitride in amounts between about 10% and about 30% are found to reduce the amount of $NO_x$ in exhaust gases at temperatures as low as 200° C.

8 Claims, No Drawings

METHOD OF REMOVING NITROGEN OXIDES FROM EXHAUST GAS MIXTURES

This is a continuation of copending application Ser. No. 835,470, filed Sept. 21, 1977, now abandoned.

BACKGROUND OF THE INVENTION

In recent years air pollution has become of greater concern to all. One of the most common sources of air pollution is the combustion products of fossil or carbonaceous fuels. Among the products of most combustion processes are oxides of nitrogen. Nitric oxide (NO) and nitrogen dioxide ($NO_2$) are commonly found in combustion products. These oxides are formed by the reaction of nitrogen and oxygen in air at elevated temperatures. Nitric oxide, and other oxides of nitrogen, are formed in combustion processes but in turn react with oxygen in the air at ambient temperatures to form more stable oxides such as nitrogen dioxide. For the purpose of describing the present invention the designation $NO_x$ will be used to encompass the various oxides or oxide mixtures of nitrogen. The presence of $NO_x$ in air also promotes photochemical reactions of hydrocarbons creating additional pollution and amog problems. $NO_x$ is formed in essentially all combustion processes and accordingly much attention has been devoted to its elimination, preferably at the source, e.g., internal combustion engines, fossil fuel power plants, chemical plants, and high temperature incinerators.

Various methods and types of equipment have been proposed to eliminate or reduce $NO_x$ from mixtures of gasses at or near the generation point of the $NO_x$. Generally these methods fall within the following catagories: absorption of $NO_x$ using water or alkali solutions; absorption of $NO_x$ using solid absorbent such as activated carbon, or; catalytic reduction of $NO_x$. Absorption in either liquids or solids requires the use of absorption towers and maintenance of the absorption medium. The capital expense and upkeep have made the absorption methods economically unfeasible and the use of such equipment in conjunction with individual internal combustion engines is neither economically nor mechanically feasible. Thus substantial studies and efforts have directed toward making the catalytic reduction of $NO_x$ operable and efficient. Examples of catalysts utilized to remove $NO_x$ are to found in U.S. Pat. No. 3,864,450 (hot carbon containing NaOH or KOH); U.S. Pat. No. 3,524,721 (promoted nickel oxide), and; U.S. Pat. No. 3,816,595 (silicon carbide, per se).

While the reaction of the present invention is not known with exactness, it is most probably to be considered in the catalytic reduction category. The methods and equipment previously used in catalytic reduction processes require a filter or bed of catalytic material through which the gas mixture is passed. The filter or bed impedes the gas flow and contributes an undesirable back pressure. Further the filter or bed becomes coated with various combustion products which drastically reduces its efficiency and results in an increase of undesired back pressure. Filtration of hot combustion gasses has not found to be an operable answer to the pollution problem. One of the more positive advantages of the present invention is that $NO_x$ is eliminated or substantially reduced from stack or emission gasses without the use of a filter or catlyst bed thus gas flow is substantially unimpeded and the efficiency of the process is greatly improved.

BRIEF DESCRIPTION OF THE INVENTION

It has now been found that $NO_x$ is substantially reduced or eliminated in stack or emission gasses which are exhausted in contact with ceramic surfaces containing silicon carbide and silica ($SiO_2$). Such ceramic surfaces, preferably in the form of pipes and conduits, are easily shaped and fabricated by known methods and may be utilized as a component part of a heat exchange system or an exhaust system. Thus the ceramic surface containing silicon carbide and silica may simply be built into existing equipment or designed to be a part of new equipment which in use is exposed to exhaust gasses containing $NO_x$. The present invention is particularly adopted to use in exhaust systems of furnaces or internal combustion engines.

The elimination of $NO_x$ in exhaust gas streams is desirable. Reductions of at least 85% are obtained by the present process and reductions of 95% or above are readily attainable.

Although it is preferred that the ceramic surface of the present invention be utilized as a component part of process equipment, such as a wall or a portion of pipe or conduit, it will be understood that the ceramic surface may be utilized in the form of an insert or lining, or merely as a slab or bar positioned to be in contact with exhaust gas.

The exposure time, the relative amount of surface area to gas flow, varies with temperature and with the concentration of $NO_x$ in exhaust gas mixtures. However, keeping in mind a reduction of 85% or more of $NO_x$ is the desired goal and with the following discussion in regard to temperature and concentration, one may easily, with some empirical testing, determine the surface area required for any given exhaust gas mixture. The present process appears to be substantially independent of pressure.

Preferably the temperature of the ceramic surface of the present invention is maintained between about 500° C. and about 1600° C. and more preferably between about 650° C. and about 1200° C. Such temperature ranges are commonly found in exhaust gas systems. Temperatures of less than about 500° C. generally do not provide the activity required to reduce the percentage of $NO_x$ 85% or greater. Temperatures greater than about 1650° C. are to be avoided as at such temperatures nitrogen and oxygen combine to form $NO_x$ and although the present process might be operable, the results would be obliterated.

The concentration of $NO_x$ in exhaust gas mixtures generally ranges from about 5 to about 5000 ppm and usually from about 50 to about 1000 ppm. The process of the present invention appears to be substantially independent of the concentration of $NO_x$ and of other components of exhaust gas mixtures.

Preferably the exhaust gas mixture is directed through a conduit fabricated of the ceramic material. Aptly suited are pipes having an ID of from about ¼" to about 8". Pipes having an ID of from about 1" to about 6" are preferred. The conduit size is adaptable to the equipment, i.e., the heat exchange unit or exhaust pipe. Although larger pipes may be useful in some applications, smaller pipe sizes are generally easier fabricated and more adaptable to process equipment. Smaller sizes are also useful if pipe or conduit liners are to be added to existing equipment. Flow rates of from about 200 cfm to about 5000 cfm in pipes of from about 1" to about 6"

ID and from about 4 to about 50 feet in length are particularly suited to use in the present invention.

DETAILED DESCRIPTION OF INVENTION

The ceramic material used in the present invention contains from about 50 to about 95% by weight silicon carbide. A material containing about 90% silicon carbide has been found eminently useful. The particle size of the silicon carbide component is preferably comparatively small, particles passing a ¼" screen opening are useful and particles passing a ⅛" screen opening are found best suited as the smaller particle size gives greater surface area and smaller size particles are easier to distribute uniformly through the ceramic mixture as it is being compounded.

In addition the ceramic material contains silica, $SiO_2$, in amounts between about 0.3 and about 10% by weight. A silica content of about 8.5% has been found aptly suited. Exceptional results and durability have been found when silicon nitride, $Si_3N_4$, is also included in the ceramic material in amounts ranging from about 10 to about 30% by weight.

The remaining components of the ceramic matrix, do not appear to be active in catalytic or promotor activity. Typically the mixture may include from about 0.1 to about 2.0% by weight of $Al_2O_3$, from about 0.1 to about 0.5% $Fe_2O_3$, and from about 0.1 to about 0.5% CaO. The ceramic mixture of the present invention has a porosity of between about 10% and about 20%, and preferably about 14%.

The activity and capacity of the ceramic material of the present invention in removing $NO_x$ from exhaust gas mixtures is surprisingly high. It is especially surprising when it is considered that no filter is required and the ceramic material is employed in the normal operating conditions of exhaust gas systems. Catalytic systems utilizing silicon carbide alone suffer break throughs, that is a sharp reduction in ability to reduce $NO_x$, at temperatures in the neighborhood of 1050° C. The ceramic material of the present invention does not suffer failure in temperature ranges generally found in exhaust gasses, e.g., from about 650° C. to about 1200° C. The term "exhaust gasses" as used herein means gasses containing $NO_x$, from which it is desired to remove $NO_x$.

It is postulated that the present reaction is catalytic in nature and involves activated adsorption of $NO_x$ at various active centers on the ceramic material surface. The $NO_x$ in turn is converted to nitrogen and oxygen and desorbed. It is further postulated that the active centers are partially isolated atoms or groups of atoms situated at lines of discontinuity, such as the edges of crystals, at the boundaries of crystal grains, or at cracks or imperfections in the small crystals constituting the surface of the ceramic material.

The following examples are illustrative of the present invention and are not to be construed as limiting. All parts are in parts by weight and all temperatures are in degrees Celcius.

EXAMPLE 1

The exhaust gasses from the combustion of natural gas used in a heat exchange unit were directed around a 6" OD, ten foot long, ceramic pipe. The temperature of the gasses entering heat exchange area were about 2600° C. with a flow rate of about 1000 cfm. The ceramic had the following composition:

| | |
|---|---|
| 89.6% | SiC |
| 8.5% | $SiO_2$ |
| 0.7% | $Al_2O_3$ |
| 0.7% | $Fe_2O_3$ |
| 0.2% | CaO |
| 0.3% | BaO |

The $NO_x$ level of the exhaust gas mixture contacting the ceramic pipe ranged from about 800 to about 1000 ppm. The $NO_x$ level in the exhaust gas mixture was found to be in the 2 to 3 ppm range.

EXAMPLE 2

A gas mixture of 750 ppm NO in $N_2$ was heated to 650° C. and directed against a particulate surface of ceramic material having the following composition.

| | |
|---|---|
| 75% | SiC |
| 0.5% | $SiO_2$ |
| 0.3% | $Al_2O_3$ |
| 0.3% | $Fe_2O_3$ |
| 0.2% | CaO |
| 23.4% | $Si_3N_4$ |
| 0.3% | Fe |

Tests with this material are designated in Column A of the following table. Thus, the table shows the NO content of the exposed gas is effectively reduced by at least 85% at 650° C. Similar tests utilizing the same material at temperatures of 200° C. and 1050° C. are shown in Column A of the following table. Similar tests utilizing the ceramic material of Example 1 are shown in Column B and tests conducted utilizing silicon carbide alone are shown in the SiC Column.

| | REMOVAL OF NO | | |
|---|---|---|---|
| | A | B | SiC |
| 200° C. | Slight | None | None |
| 650° C. | over 85% | over 85% | over 85% |
| 1050° C. | Substantially complete | over 85% | none-break through after 1 second exposure |

EXAMPLE 3

A mixture of $NO_2$ in $N_2$ containing about 485 ppm of $NO_2$ was conducted through a pipe of the ceramic material of Example 1 heated to a temperature of 1000° C. The pipe had an ID of 1" and was 14" in length. The flow rate of the gas mixture through the pipe was about 10 liters/min. It was determined by infra-red spectography that the existing gas contained less than 30 ppm $NO_2$.

What is claimed is:

1. A method of removing $NO_x$ from exhaust gas mixtures by exposing the gas mixture in a substantially unimpeded flow to a ceramic material containing from about 75 to about 95% by weight silicon carbide and from about 0.3 to about 10.0% by weight silica at a temperature of at least about 1050° C. and less than about 1650° C. for a time sufficient to reduce the $NO_x$ content by at least 85%.

2. The method of claim 1 wherein the ceramic material contains from about 10 to about 30% by weight of silicon nitride.

3. The method of claim 1 wherein the ceramic material is in the form of a pipe.

4. The method of claim 1 wherein the temperature is maintained between about 1050° C. and about 1600° C.

5. The method of claim 1 wherein the silicon carbide is particulate and of a size passing a ¼" mesh screen.

6. The method of claim 1 wherein the ceramic material has a porosity of between about 10 and about 20%.

7. The method of claim 1 wherein the exhaust gas is from the combustion of a fossil fuel.

8. The method of claim 1 wherein the exhaust gas is from an internal combustion engine.

* * * * *